United States Patent [19]

Takasa et al.

[11] Patent Number: 4,962,001
[45] Date of Patent: Oct. 9, 1990

[54] BIAXIALLY ORIENTED POLYOXYMETHYLENE FILM

[75] Inventors: Kenji Takasa, Yokosuka; Satoshi Iijima, Kamakura, both of Japan

[73] Assignee: Asahi Kasei Kogyo Kabushiki Kaisha, Osaka, Japan

[21] Appl. No.: 326,063

[22] Filed: Mar. 20, 1989

Related U.S. Application Data

[62] Division of Ser. No. 925,606, Oct. 31, 1986, Pat. No. 4,835,245.

[51] Int. Cl.$^5$ .................. B29C 55/12; B32B 27/42
[52] U.S. Cl. .................. 428/524; 428/694; 428/900; 428/910
[58] Field of Search .......... 428/524, 694, 900, 910

[56] References Cited

U.S. PATENT DOCUMENTS 4,835,245  5/1989  Takasa et al. .................. 528/230

Primary Examiner—Morton Foelak

[57] ABSTRACT

This present invention provides a biaxially oriented film of a polyoxymethylene polymer having the main part of each of the main chains thereof substantially composed of repeating units of the oxymethylene group, $-(CH_2-O)-$, which biaxially oriented polyoxymethylene polymer film is characterized by the fact that the crystallinity thereof measured by the density method is in the range of 75 to 95% and the degree of crystal orientation measured by the X-ray diffraction method in the two directions of end and edge are each in the range of 80 to 98%. This film possesses a high modulus of elasticity, outstanding dimensional stability, and low equilibrium water absorption ratio and, therefore, it is particularly suitable as a base film of a magnetic recording medium. This film is produced by accurately controlling the orientation conditions and other processing conditions.

5 Claims, 5 Drawing Sheets

100 μm

100 μm

BIAXIALLY ORIENTED POLYOXYMETHYLENE FILM

This application is a divisional of copending application Ser. No. 06/925,606, filed on Oct. 31, 1986, now U.S. Pat. No. 4,835,245.

BACKGROUND OF THE INVENTION

1. Field of the Invention

The present invention relates to a biaxially oriented film of a polyoxymethylene polymer having the main part of the each of the main chains thereof composed of repeating units of the oxymethylene group, $-CH_2-O-$, in which said biaxially oriented film is highly oriented and crystallized and possesses high rigidity and high dimensional stability.

2. Description of the Prior Art

In recent years, owing to the growing trend of electronics devices toward the addition of density, reduction of size, and acceleration of signal processing speed, the providing of films which are to be used for such magnetic recording media as video tapes, audio tapes, and floppy discs of minimum thicknesses and with ensured high dimensional stability, are being urged with increasing enthusiasm. Fulfilment of these requirements necessitates the development of a high-performance film which possesses outstanding rigidity and dimensional stability. The present invention has been originated due to the appreciation of a polyoxymethylene polymer film as a promising film that may satisfy these requirements. One of the objects of the present invention is to provide a biaxially oriented polyoxymethylene polymer film which possesses high rigidity and high dimensional stability.

The polyoxymethylene polymer film is generally formed by melt pressing or melt extruding the film or sheet form of the polymer and subsequently quenching the pressed or extruded film or sheet. The film obtained by this type method is opaque or translucent and further, is deficient in mechanical properties. Various means of improving the transparency and the mechanical property of this film have heretofore been tried. The technical advance in this field has reached a point where there are produced films with the transparency and mechanical properties thereof having been improved to an appreciable extent. Even though handling of the polyoxymethylene polymer film is extremely more difficult as compared with conventional films, the outstanding properties inherent in this film, i.e. the excellent rigidity and dimensional stability possessed by this film as a biaxially oriented film, have not eluded attention.

It is held that one of the causes for the difficulty experienced in the handling of the polyoxymethylene polymer film resides in the relatively large spherulites which are present in the crystalline structure. Japanese Patent Publication No. 21994/1965 discloses a method for the production of a polyoxymethylene polymer film with improved transparency and mechanical property by the steps of rolling a crystallized polyoxymethylene film translucent or opaque owing to the presence of sphelurites at a rolling temperature of not higher than 120° C. until the film becomes substantially transparent and substantially ceases to show any detectable sphelurite under a microscope in visible light and subsequently stretching the rolled film at a temperature in the range of 120° to 180° C. by a ratio of not less than 25% in at least one axial direction.

This method is characterized in that the transparency of the film is improved and the orientation of the crystals of the film is facilitated by rolling the film. As a result, the film obtained by this method is improved in transparency and mechanical property over the film obtained by a conventional method.

Generally, the rigidity of a film is said to be proportional to the modulus of elasticity of the film. To be specific, the rigidity increases in proportion as the modulus of elasticity increases. In the case of a polyoxymethylene polymer film, the highest modulus of elasticity indicated in the working examples of the prior art mentioned above is 530 $kg/mm^2$, whereas the modulus of elasticity in the direction perpendicular to the direction in which the aforementioned highest modulus is manifested is reported to be about 420 $kg/mm^2$. The improvement of rigidity to the extent mentioned above is far short of being sufficient for a high-performance film of high rigidity. It is not the type of improvement which the present invention expects to achieve. This prior publication does not disclose the improvement of the possibility of this magnitude being further increased or of a device or means which is capable of permitting this improvement increase.

In the case of the polyoxymethylene polymer film, it has been held that it is extremely difficult to have the crystals of the film oriented to an appreciably high degree by any conventional means of orientation, owing to the presence of spherulites in the crystalline structure mentioned above. The aforementioned prior invention has realized the orientation of crystals of the film to an appreciable extent. The properties which are acquired by the film produced by the prior invention, however, hardly reach the level that the present invention expects to obtain. These properties have been heretofore resignedly been accepted as the maximum levels of performance which could be attained by the polyoxymethylene polymer film used as a biaxially oriented film.

SUMMARY OF THE INVENTION

The present inventors have taken notice of the high crystallinity as a conspicuous trait of a polyoxymethylene polymer. They have continued a diligent study with a view toward making the most of this trait. The present inventors have perfected the present invention after repeating various studies on more accurate control of processing conditions such as the conditions of orientation. To be specific, the present inventors have perfected a polyoxymethylene polymer film which has a highly enhanced level of crystallinity and which has a highly improved orientation of crystals and, at the same time, discovered that this film possesses a high modulus of elasticity and outstanding dimensional stability. The present inventors have consequently invented a polyoxymethylene polymer film which possesses high rigidity and high dimensional stability.

The present invention provides a biaxially oriented film of a polyoxymethylene polymer having the main part of each of the main chains thereof substantially composed of repeating units of the oxymethylene group, $-(CH_2-O)-$, in which said biaxially oriented polyoxymethylene polymer film is characterized by the fact that the crystallinity thereof, measured by the density method, is in the range of 75 to 95% and the degree of crystal orientation, measured by the X-ray diffraction method in the two directions of end and edge, are each in the range of 80 to 98%.

The present invention also provides a method for the production of a biaxially oriented film of a polyoxymethylene polymer having the main part of each of the main chains thereof substantially composed of repeating units of the oxymethylene group, $-\!\!\left(\!CH_2\!-\!O\!\right)\!\!-$, which method is characterized by the steps of stretching (pre-stretching) a raw sheet or film resulting from the preceding melting and solidifying steps in one direction, then retaining the pre-stretched sheet or film at a temperature not lower than the level of 30° C. below the peak temperature in the crystal melting curve of the raw sheet or film measured with a differential scanning calorimeter and not higher than the level of 5° C. above the peak temperature, and subsequently post-stretching the pre-stretched sheet or film in the direction perpendicular to the direction of the pre-stretching.

Furthermore, the present invention provides a method for the production of a biaxially oriented film of a polyoxymethylene polymer having the main part of each of the main chains thereof substantially composed of repeating units of the oxymethylene group, $-\!\!\left(\!CH_2\!-\!O\!\right)\!\!-$, which method is characterized by the steps of rolling a raw sheet or film resulting from the preceding melting and solidifying steps in the longitudinal direction until the draft, r, satisfies the formulae:

$$1.2 \leq \frac{1}{1-r} \leq 6$$

$$r = 1 - \frac{t}{t_0}$$

wherein $t_0$ stands for the thickness of the raw film or sheet before rolling and t for the thickness of the film or sheet after rolling, then stretching the longitudinally rolled film or sheet by a ratio of not less than 5 times in the lateral direction, and subsequently stretching the laterally stretched film or sheet by a ratio of not less than $5 \cdot (1-r)$ times.

DETAILED DESCRIPTION OF THE INVENTION

The film contemplated by the present invention is required to be such that the crystallinity thereof and the degree of orientation of the crystals thereof, as parameters of the construction thereof, will meet the following conditions. In the first place, the crystallinity is required to be such that the crystallization (D) calculated in accordance with the following formula using the density (d) of the film measured by the density gradient tube method will fall in the range of 75 to 95%.

$$D = \frac{dc(d - da)}{d(dc - da)} \times 100 \, (\%)$$

In the formula, dc stands for a constant, 1.506 g/cc, denoting the density of a theoretically perfectly crystallized polymer and da is a constant, 1.25 g/cc, denoting the density of a corresponding perfectly amorphous polymer. If the crystallinity is less than 75%, the amorphous portion of the film conspicuously manifests its effect, impairing the rigidity and the dimensional stability of the film even when the degree of orientation of the crystals of the film may be sufficiently high. If the crystallinity exceeds 95%, the film itself is formed with great difficultly owing to characteristic properties of polyoxymethylene polymer.

Figure 1:
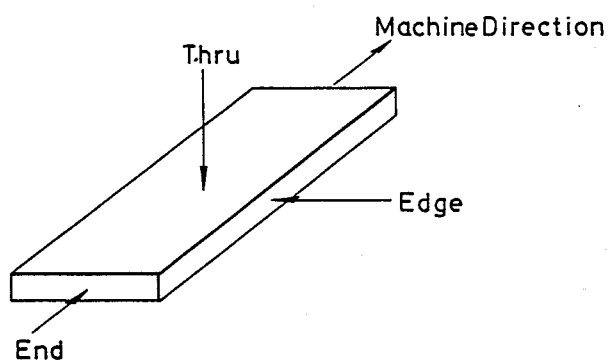
FIG. 1 is an explanatory diagram illustrating the bearing of a sample for the determination of the degree of orientation of crystals by the X-ray diffraction method.

The second parameter consists in the degree of orientation of crystals of the film. It can be determined in accordance with the distribution of the magnitude of diffraction which is obtained by injecting an X-ray in the direction of "end" or "edge" of a polyoxymethylene polymer film as illustrated in FIG. 1 and scanning the (100) plane ($2\theta=22°$ to $23.5°$) of the polyoxymethylene polymer film with respect to the magnitude of diffraction in the azimuth angle. The "end" direction of the film is a direction which is parallel with the plane of the film and also parallel with the machine direction (the direction of extrusion) of the film, whereas the "edge" angle direction of the film is a direction which is parallel with the plane of the film and also parallel with the direction of width of the film. In the present invention, the value (A) calculated in accordance with the formula:

$$A = \frac{180 - W}{180} \times 100 \, (\%)$$

using the half-value width (W) of the diffraction peak measured with the azimuth angle, 90°, as the center is reported as the degree of orientation of crystals. For the purpose of the present invention, the degrees of orientation of crystals measured in the direction of end and that of edge are each required to fall in the range of 80 to 98%. If the degree of orientation of crystals is less than 80%, the crystals are oriented insufficiently so that even in the case of a film which satisfies the aforementioned condition on crystallinity, the film cannot be expected to possess high rigidity sufficient for a biaxially oriented film. If the degree of orientation of crystals exceeds 98%, the polyoxymethylene polymer film itself is formed with extreme difficulty owing to the characteristic properties of polyoxymethylene polymer.

For the present invention, it is an essential requirement that the aforementioned two constructional parameters should be fulfilled at the same time. When a polyoxymethylene polymer film satisfies this requirement, this film possesses the outstanding qualities of high rigidity and high dimensional stability. To be more specific, the modulus of elasticity of this film in either of the two axial directions is not less than 450 kg/mm$^2$, a value surpassing the conventional maximum. For the film to acquire better properties, the crystallinity is desired to fall in the range of 77 to 95% and the degree of orientation of crystals in the range of 85 to 98%. Then, it becomes possible to heighten the modulus of elasticity in each of the axial directions even above 500 kg/mm$^2$.

The polyoxymethylene polymer film of the present invention is derived from a polyoxymethylene polymer of a grade having a relatively high molecular weight such as, for example, a number average molecular weight in the range of 35,000 to 300,000. For the sake of the present invention producing a film of high rigidity and high dimensional stability, the polyoxymethylene polymer to be used therefor is desired to have a relatively high molecular weight. The present invention is also applicable to a polyoxymethylene polymer derivative such as the acetalized polyoxymethylene polymer, the product of reaction of polyoxymethylene polymer with an isocyanate, or the copolymer obtained by the copolymerization being conducted in the presence of a small amount of a third component to form the polyoxymethylene polymer which has the main part of each of the main chains thereof substantially composed of repeating units of the oxymethylene group, $-(CH_2-O)-$.

The method for producing a film satisfying the parameters contemplated by the present invention will be specifically described below.

First, a sheet or film of the aforementioned polymer (hereinafter referred to as "raw film") is formed by the conventional method such as melt pressing or melt extruding the polymer and subsequently quenching the pressed or extruded polymer film. In this case, the degree of crystallization of the raw film generally falls in the range of 60 to 75%, though variable with such molding conditions as the conditions of cooling subsequent to the melting.

Then, the raw film is stretched by a ratio of at least 5 times in each of the axial directions. In other words, the film of the present invention has originated in perception of the idea of stretching the raw film by a high ratio of at least 5 times.

In connection with this stretching, special attention must be paid to the stretching temperature. The temperature for the stretching of the raw film of the present invention falls in the range between the level of 25° C. below the peak temperature in the crystal melting curve of the raw film measured with a differential scanning calorimeter (DSC) and the level of 5° C. above the aforementioned peak temperature.

If the stretching temperature is below the lower limit of the range mentioned above, the crystalline molecules of the raw film are oriented with difficulty and the produced film is susceptible of flushing or fracture. If the stretching temperature exceeds the upper limit of the range, the crystalline molecules of the raw film are predominantly melted and cannot be expected to be effectively oriented and, in an extreme case, the produced film is liable to be broken by melting. Preferably, the range of the stretching temperature is between the level 15° C. below the aforementioned peak temperature and the level equalling the aforementioned peak temperature. The film produced at a stretching temperature falling in this preferred range enjoys more uniform stretching.

Incidentally, the peak temperature of the crystal melting curve measured with the differential scanning calorimeter generally falls between 173° and 178° C., though variable with the molecular weight of the raw film, the degree of crystallization, or the molding conditions.

The biaxially oriented polyoxymethylene polymer molecules highly crystallized and highly oriented is obtained by stretching the raw film by a ratio of at least 5 times the original size in each of the axial directions. In the polyoxymethylene polymer film produced as described above, the modulus of elasticity in each of the axial direction has a high value exceeding 450 kg/mm$^2$. Further owing to the high degree of crystallization, the produced film enjoys outstanding dimensional stability.

The film of the present invention is characterized by the constructional parameters, i.e. crystallinity and degree of orientation of crystals. The relation between the modulus of elasticity and the ratio of stretching which are characteristic of this film are variable with the crystallinity of the raw film, the conditions of the stretching, or other similar factors and is not fixed by an all-inclusive rule. A desire to impart an increased modulus of elasticity to the film is satisfied only by stretching the raw film by an increased ratio under the stretching conditions mentioned above. For example, the film can even be enabled to acquire such an extremely high modulus of elasticity as more than 700 kg/mm$^2$ by effecting the stretching of the raw film at a ratio of more than 8 times the original size. This value, 700 kg/mm$^2$, is about 3 times that of the film possessing a high modulus of elasticity and exhibiting an outstandingly high level of rigidity.

The stretching of the raw film, when necessary, can be carried out in such a manner as to confer anisotropy upon the modulus of elasticity in each of axial directions of the film. This can be easily accomplished by suitably differentiating the ratio of stretching in each of the axial directions. For example, the raw film can be stretched at a ratio of more than 10 times in the longitudinal direction and at a ratio of more than 5 times in the lateral direction.

As a general biaxial stretching method, the longitudinal-lateral or lateral-longitudinal sequential biaxial stretching method or the simultaneous biaxial stretching method has been known. Where any of the above method is directly applied to the film of the present invention to orient the crystals uniformly and stably by stretching the film, it is extremely difficult to acquire a satisfactory orientation due to the heavy existence of sphelurites in the crystalline structure as described above. And, the stretching temperature and other conditions must be controlled with the atmost exactness. Therefore, there is adopted a method of stretching the raw sheet after it has undergone a treatment with a means capable of facilitating the stretching. For example, the method of the aforementioned prior invention may be used as auxiliary means. In this case, the raw film is rolled with a suitable rolling mill before it is subjected to stretching. By the rolling, the raw film is stretched in the direction of rolling and, at the same time, the spherulites in the raw film are partly deformed or fractured, so much as to facilitate the subsequent stretching. But, when the raw film is stretched only in one direction by the rolling and subsequently subjected to the simultaneous biaxial stretching, for example, there ensues the so-called necking, i.e. non-uniform stretching. By this particular procedure, it is difficult to obtain uniform stretching. The sequential biaxial stretching, for the reason to be given afterward, produces a stably stretched film with difficulty. The batch type production procedure which comprises effecting the rolling operation in the direction of rolling and additionally in the direction of width, namely, the direction perpendicular to the direction of rolling and thereafter subjecting the rolled raw film to simultaneous biaxial stretching, therefore, provides a high stretching and permits the production of a uniformly and stably stretched film. In this case, the sequential biaxial stretching, when effected by an ordinary procedure, is not sufficient to provide a stable stretching for the reason to be given afterward. In this case, the rolling is effected until the size of the rolled raw film increases to 1.1 to 4 times the original size of the raw film in each of the axial directions.

Where the raw film is rolled before it is stretched, since the raw film is already stretched during the course of the rolling, the ratio of the stretching effected during the course of the stretching is regarded as including the ratio of the stretching during the rolling. When the film is to be produced as stretched at a ratio of 10 times, for example, the raw film which has been stretched to 2 times during the rolling has to be stretched in the regular stretching process by a ratio of 5 times the original size of the rolled raw film. Thus, the ratio of stretching contemplated in the present case is based on the size of the raw film to in its original unrolled and unstretched form.

As means of facilitating the orientation of crystals in the raw film, a method which is also the batch type production method to be described below by way of illustration can be adopted. First the raw film is preheated to a suitable temperature in the range of 100° to 150° C. and then pressed. The work of pressing in this case can be easily carried out as with a compression molding machine, for example. In consequence of this pressing work, the crystals in the raw film are preparatorily oriented in the two axial directions. During the course of the subsequent stretching, the preparatorily oriented crystals can be easily oriented to a great extent. For the same reason as described above, the stretching is desired to be effected simultaneously in the two axial directions. In the pressing operation described above, the preparatory orientation of the raw film can be carried out more easily by nipping the raw film between films of a suitable resin such as, for example, the resin of polymethyl methacrylate (PMMA) which possesses more desirable flowability than the polyoxymethylene polymer and pressing the raw film together with the outer resin films. The ratio of stretching of the raw film by the preparatory orientation treatment with pressure is 1.1 to 4 times in either of the axial directions. This ratio, similarly to that of stretching by the rolling, can be included in the ratio of the regular stretching.

Procedures available for the production of the film of the present invention have been described above by way of illustration. The above two typical procedures are based on the principle that the simultaneous biaxial stretching is effected after the biaxial rolling or pressure stretching operation has been performed as means of facilitating the orientation of crystals. They do not fit for commercial production of the film because they are inherently batch type production methods and the operational processes involved therein are complicated and the operations themselves are deficient in preductivity. The continuous rolling in the two axial directions has not yet been perfected from the technical point of view. The pressure stretching is continuously carried out only with great difficulty. Further, the simultaneous biaxial stretching method is deficient in productivity and the apparatus used for this method is complicated and expensive.

The present inventors have continued a diligent study in search of a method for the production of the film, which is readily commercialized and proves advantageous in terms of both productivity and economy. As the result, the present inventors have succeeded in making the present invention all the more perfect.

It is the sequential biaxial stretching method that proves advantageous from the commercial point of view. Specifically, this method comprises first stretching the raw film in one direction (pre-stretching) and subsequently stretching it in the direction perpendicular to the first direction (post-stretching). In the case of polyoxymethylene polymer, the operational steps up to and including the pre-stretching can be relatively easily carried out. When the crystals which have already been oriented in one specific direction in the pre-stretching step are to be re-oriented in the perpendicular direction in the subsequent post-stretching step, there ensues the possibility that owing to the characteristic crystalline structure of polyoxymethylene polymer, part of the crystalline moleculars will be severed one from another and the film being stretched will sustain fracture. In this case, therefore, it is difficult to obtain a stable stretched film because, during the course of the post-stretching, the film under treatment sustains fracture before the film is stretched to the desired ratio.

The present inventors have conducted an elaborate analysis on the behavior of the film during the course of the stretching particularly with a view to unveiling the cause for the fracture sustained by the film in the post-stretching step, i.e. while the film is being stretched in the direction perpendicular to the direction of stretching in the pre-stretching step.

In the film which has undergone the pre-stretching treatment, the crystals of polyoxymethylene are oriented and crystallized preferentially in the direction of the stretching. Thus, the film shows a sign of increased crystallinity. In the course of the post-stretching, therfore, the film is liable to sustain fracture along the direction of the pre-stretching, depending on the condition of the orientation of crystals effected in the pre-stretching operation. In the post-stretching operation, the film exhibits an increased stretching stress which is ascribable to the aforementioned increase of crystallinity. It is inferred that since in the post-stretching step, the film itself is more susceptible of fracture than in the pre-stretching step and the stretching stress generated in the film is large, a minute defect possibly existing from the beginning in the film or a minute notch generated in either of the edges of the film triggers a fracture in the film.

Incidentally, the crystallinity of unstretched polyoxymethylene polymer (raw film) measured by the density method generally falls in the range of 60 to 75%, though variable with the film forming conditions such as the conditions of the cooling of the molten film. When this raw sheet is stretched in one direction, the crystallinity of the stretched film increases to a level in the range of 70 to 85%. For the purpose of alleviating the increase of stretching stress due to this increase of crystallinity, there may be adopted means such as of quenching the sheet emanating from the pre-stretching step. This means is not appreciably effective in alleviating the increase of stretching stess in the case of polyoxymethylene polymer and fails to offer a solution to the problem under discussion. All these phenomena originate in the peculiar qualities of polyoxymethylene, i.e., a high capacity for crystallization and a high speed of crystallization. They form a cause for the difficulty entailed in direct application of the conventional stretching technique to polyoxymethylene polymer.

With a view to solving this problem, the present inventors have made a deliberate analysis on the behavior of crystals during and after stretching. The present inventors have consequently found that the portion of the process which follows the pre-stretching operation and precedes the post-stretching operation constitutes a key to the problem, that the hysteretic temperature of the film during this intervening period has a close bearing on the increase of crystallinity, and that this hysteresis forms a direct cause for the increase of the stretching stress in the post-stretching step and further for the consequent decline of stretching property. To be more specific, the present have ascertained it to themselves that the stretching stress is notably alleviated and the stretching property is improved to a great extent in the post-stretching step when the film emanating from the pre-stretching step is retained at a temperature above a certain level without being cooled and then subjected to the post-stretching operation.

On the basis of this knowledge, the present inventors have perfected a sequential biaxial stretching method for the production of the film of the present invention, which method comprises stretching (pre-stretching) in one direction a raw sheet or film resulting from the preceding melting and solidifying steps, retaining the pre-stretched sheet or film which has not been cooled, at a temperature not lower than a level of 30° C. below the peak temperature of the crystal melting curve of the raw film determined by the use of a differential scanning calorimeter and not higher than a level of 5° C. above the aforementioned peak temperature, and subsequently post-stretching the sheet or film in the direction perpendicular to the direction to the pre-stretching.

The method mentioned above will be described in detail below. First the polyoxymethylene polymer sheet or film (raw film) is formed by the conventional means such as, for example, the steps of melt extruding the polyoxymethylene resin and subsequently quenching the melt extruded sheet of resin. Then, this raw film is stretched (pre-stretched) in one direction. The stretching temperature during the course of this pre-stretching operation constitutes itself an important factor for the present invention. It is required to fall in the range between the level of 25° C. below the peak temperature of the crystal melting curve of the raw film determined by the use of a differential scanning calorimeter and the level of 5° C. above the aforementioned peak temperature, preferably between the level of 15° C. below the aforementioned peak temperature and the level equalling the aforementioned peak temperature.

Subsequently, in the post-stretching step, the sheet or film which has been stretched in one direction is stretched in the direction perpendicular to the direction of the pre-stretching. During the interval between the pre-stretching and post-stretching steps, the temperature of the aforementioned sheet or film must be retained in the range defined above without cooling it. To be specific, this temperature must be retained within the range between the level of 30° C. below the peak temperature of the crystal melting curve of the raw sheet determined by the use of the differential scanning calorimeter and the level of 5° C. above the aforementioned peak temperature.

If the temperature of the sheet or film is lower than the lower limit of the aforementined range, the orientation of crystals in the pre-stretching step proceeds so rapidly that the stretching stress is sharply increased in the subsequent post-stretching step. There are indications that this lower limit of the range of the temperature has a close bearing upon the temperature for the growth of polyoxymethylene polymer crystals. As the temperature of the film approaches this lower limit, the speed of crystallization increases. When the film temperature fails below this lower limit, the speed of crystallilzation becomes so large that the control of the speed becomes substantially impossible from the process point of view. For the purpose of stably controlling the process and enabling the post-stretching operation to be stably accomplished, therefore, the lower limit of the temperature for the retention of the film is desired to be 20° C. below the peak temperature of the crystal melting curve of the raw sheet determined by the use of the differential scanning calorimeter.

If the temperature of the sheet or film is higher than the upper limit of the aforementioned range, the crystalline molecules are predominantly melted and the effect of the pre-stretching operation in the orientation of crystals is impaired and the film possibly sustains breakage due to melting. Preferably, the upper limit of the aforementioned range of film retention temperature is the peak temperature in the aforementioned crystal melting curve.

In the conventional stretching process, the pre-stretching operation and the post-stretching operation are continuously carried out. For the efficiency of production and for the convenience of apparatus, it is more advantageous to set the film retention temperature in the neighborhood of the stretching temperature. It may safely be concluded that this practice enables the process control to be carried out more easily and more stably.

For the purpose of retarding the progress of crystallization, the duration of the retention of the film at the aforementioned temperature is desired to be as brief as possible. Specifically, this duration falls in the range of 0.1 to 600 sec., though variable with the retention temperature itself.

Then, the aforementioned sheet or film in the subsequent post-stretching step is stretched in the direction perpendicular to the direction of stretching in the preceding pre-stretching step. The stretching temperature in this case is important similarly to that of the pre-stetching step. Similarly to the stretching temperature in the pre-stretching step, this stretching temperature is what is defined specifically by the present invention. The stretching temperature in the post-stretching step is not necessarily identical with that in the pre-stretching step but may be suitably selected in the aforementioned range, depending on the stretching conditions such as the stretchability of the film under treatment.

The aforementioned sequential stretching method can be effected in either of the two patterns, i.e. the longitudinal-lateral pattern or the lateral-longitudinal pattern, depending on whether the longitudinal stretching, namely the stretching in the machine direction of film, or the lateral stretching, namely the stretching in the direction of width, is carried out in the pre-stretching step or the post-stretching step. The present invention does not discriminate the sequential stretching method by the choice between these two patterns.

In the production of the film of the present invention, the film can be produced more stably and uniformly when the film is treated by means capable of facilitating the stretching before it is subjected to the biaxial stretching operation. It is the rolling that provides this treatment most advantageously from the commercial point of view. Generally when a film is rolled, however, the condition of orientation of crystals and the condition of deformation are entirely different in the direction of rolling and in the direction perpendicular to the direction of rolling and the behavior of the film during stretching is completely different in the two axial directions. This anisotropy constitutes itself a serious drawback in the case of a biaxially oriented film which, as contemplated by the present invention, is required to be stretched to a great extent in the two axial directions. For the elimination of this anisotropy, there may be conceived an idea of rolling the film in two axial directions, i.e. the direction of rolling and the direction of width perpendicular to the direction of rolling. The technique of biaxial rolling has not yet been established in the field of polymers, though it is reported to have been partly commercialized in the field of metal fabrication. Thus, this technique is applied commercially to the film processing with extreme difficulty.

The present inventors have launched an elaborate analysis on the condition of orientation of crystals and the condition of deformation to be brought about by the action of rolling, conducted a repeated test on the film for tensile properties exhibited in the direction of rolling and in the direction perpendicular to the direction of rolling for the purpose of evaluating the stretching property, tried various methods of stretching on the rolled film, made a detailed study of the conditions of such stretching methods, and performed an elaborate analysis on the behavior of crystals during the stretching operations. As the result, the present inventors have found a method which, by conventional uniaxial rolling, i.e. the rolling made in the longitudinal direction of film, instead of the biaxial rolling generally held as extremely difficult of commercialization, the film is enabled to be easily stretched biaxially to a great extent in the subsequent stretching process.

In accordance with this method, the raw film formed by the conventional method is rolled. This rolling can be effected by the use of the conventional rolling mill. The rolling mill comes in the two-high rolling type, the four-high rolling type, and other multi-high rolling types, depending on the purpose of use. In the present invention, use of the two-high or four-high rolling mill fully suffices for the purpose of the rolling contemplated. By this rolling operation, the raw film is rolled in the longitudinal direction thereof, i.e. the direction of the machine. The ratio of rolling in this case is desired to be in the range of 1.2 to 6 times. If this ratio is less than 1.2 times, the effect of rolling is small. If this ratio exceeds 6 times, the film becomes liable to sustain fracture in the direction of the machine in the subsequent stretching process. Preferably, the ratio of rolling is in the range of 1.5 to 4 times.

To express the rolling effected in this case in terms of the draft, r, which is defined as: $r = 1 - (t/t_0)$, (wherein $t_0$ stands for the thickness of film or sheet before rolling and t for the thickness of film or sheet or sheet after rolling), the rolling is desired to fall in the following range:

$$1.2 \leq \frac{1}{1-r} \leq 6$$

preferably in the following range:

$$1.5 \leq \frac{1}{1-r} \leq 4$$

During the course of the rolling, the temperature of the film or sheet is desired to fall in the range between the normal room temperture and the level of 30° C. below the peak temperature in the crystal melting curve of the raw sheet determined by the use of a differential scanning calorimeter. Preferably, this temperature is in the range between the room temperature and th elevle of 50° C. below the aformentioned peak temperature. From the standpoint of the efficiency of rolling operation, the temperature of film or sheet during the course of rolling is desired to be as high as permissible. If this temperature is higher that the level of 30° C. below the peak temperature of the aformentioned crystal melting curve, the film is liable to exhibit inferior stretchability in the subsequent stretching process.

Optionally, the faw film may be preheated in advance of the rolling operation. It is also permissible to perform the rolling as split into a plurality of rounds instead of being rolled at once by the desired ratio.

By the rolling described above, the spherulites of polyoxymethylene polymer existing in the crystalline structure of the raw film are partly fractured and are deformed so as to be oriented preferentially in the direction of rolling. In other words, in consequence of the rolling, the decline of crystallinity due to the destruction of spherulites and the orientation of crystals in the direction of rolling occur at the same time. The present inventors have succeeded in having this particular phenomenon reflected and utilized in the subsequent stretching process.

After the raw film has been rolled as described above, it is stretched in the direction of width thereof (lateral stretching). At this time, the raw film has acquired improved stretchabililty because the crystallinity thereof has been lowered by the rolling, rendering it easy to stretch the film to a great extent in the direction width. In the subsequent longitudinal stretchng step, since part of the crystals oriented during the course of rolling still retain their oriented state, the stretching in the direction of this orientation is carried out with ease.

The decline of crystallinity gains in magnitude in proportion as the degree of rolling is incresed. If the degree of rolling exceeds the aforementioned range, however, the proportion of the decline of crystallinity decreases and, worse still, the rolled raw film itself is degraded and the orientation of crystals in the direction of rolling occurs preferentially and, as a result, in the subsequent lateral-stretching step, the possibility of the sheet sustaining fracture in the direction of rolling or the longitudinal direction becomes so conspicuous as to render application of the method difficult.

This particular method has issued from the idea of positively making effective use of the anisotropy, a usually detrimental phenomenon ascribable to the preferential orientation of crystals in the direction of rolling and combining this phenomenon with the decline of crystallinity, a different form of change.

The incorporation of the rolling step in the entire process of production can be expected to bring about the effect of curbing the possible occurrence of minute voids in the sheet during the course of stretching and the effect of enhancing the transparency of the sheet besides the effects mentioned above.

The present inventors have conceived this unique process after performing an elaborate analysis of the conditions of rolling during the course of rolling and the crystalline structure of the film resulting from the rolling. In this method, the raw film which has been rolled is subjected to the lateral-longitudinal sequential biaxial stretching operation which comprises first stretching the rolled raw film in the lateral direction, namely in the direction perpendicular to the direction of rolling, and subsequently stretching film in the longitudinal direction, namely in the direction of rolling. In the interval between the lateral pre-stretching step and the longitudinal post-stretching step, therefore, the procedure described in the paragraph dealing with the aforementioned sequential biaxial stretching process can be applied to the method of interest to enable the method to produce a more stably and uniformly stretched film. The procedure specifically comprises retaining the temperature of the film freshly emanating from the lateral stretching operation at a temperature in the range between the level of 30° C. below the peak temperature in the crystal melting curve of the raw film determined by the use of a differential scanning calorimeter and the level of 5° C. above the aforementioned peak temperature without subjecting to cooling and subsequently subjecting the film to the longitudinal stretching operation. For the production of the film of the present invention, this procedure proves highly desirable.

The lateral stretching is generally carried out by the use of a lateral stretching machine called a tenter. By this stretching, the rolled film or sheet is stretched in the direction of width. The ratio of stretching in this case is at least 5 times.

Then, the longitudinal stretching is generally carried out by the use of a roll stretching machine. By this stretching, the laterally stretched film is stretched in the direction of length. The ratio of stretching in this case is at least 5 times the size of the raw film, namely the film or sheet before rolling, in the direction of length. When the ratio of rolling during the course of the rolling operation was high, the ratio of stretching in the stretching operation can be lowered proportionately. For example, when the ratio of rolling is 2 times and 2.5 times the original size of the raw film, the ratio of stretching during the course of the longitudinal stretching operation is at least 2.5 times and 2 times respectively of the size of the rolled film. Specifically, in terms of the draft, r, defined previously, the ratio of stretching during the course of the longitudinal stretching operation is at least $5 \cdot (1-r)$ times. By increasing this ratio of stretching further, the produced film is allowed to acquire a greater magnitude of rigidity.

For the sake of the stretching process, the stretching temperature constitutes itself a particularly important factor and dictates special attention. The stretching temperature must fall in the range between the level of 25° C. below the peak temperature in the crystal melting curve of the raw film determined by the use of a differential scanning calorimeter and the level of 5° C. above the aforementioned peak temperature, preferably between the level of 15° C. below the aforementioned peak temperature and the level equalling the peak temperature.

Figure 2:
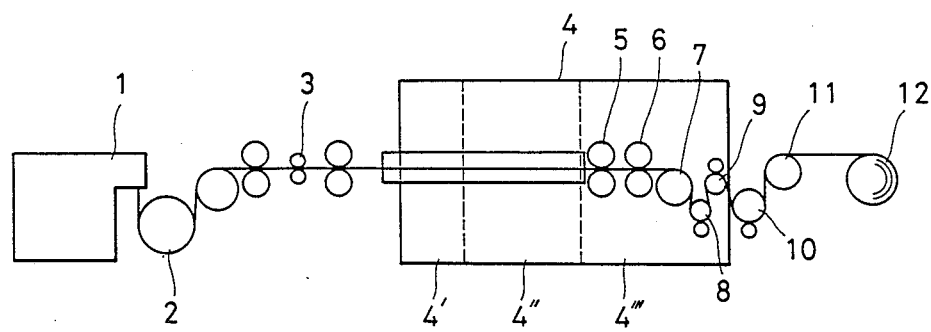
FIG. 2 is a schematic diagram of a typical procedure for the production of a film of the present invention. In the diagram, 1 stands for an extruding machine, 2 for a cooling roller, 3 for a rolling mill, 4 for a lateral stretching machine, 4' for a preheating zone, 4" for a stretching zone, 4''' for a temperature retention zone, 5 and 6 each for a pinch roller, 7 for a heating roller, 8 and 9 each for a stretching roll, 10 and 11 each for a cooling roller, and 12 a takeup roll.

Now, a typical method for the production of the polyoxymethylene polymer film in accordance with the present invention will be described specifically below with reference to FIG. 2.

A film of polyoxymethylene resin emanating from extruder 1 is cooled by cooling roller 2 to give rise to a raw film. Then, this raw film is led to rolling mill 3, to be rolled thereby. Subsequently, the rolled raw film is led to lateral stretching machine 4. The lateral stretching is generally carried out by the use of a tenter. The film is preheated in preheating zone 4' up to the stretching temperature and then laterally stretched in stretching zone 4''. In temperature retaining zone 4'' which intervenes between the pre-stretching step and the post-stretching step as described above, pinch rollers 5 and 6 disposed therein serve the purpose of fixing the film which has undergone the lateral stretching treatment. While the film is fixed therein, the edges of the film may be fabricated as for insertion of slits, for example. Optionally, this insertion of slits may be perfomed subsequently to the following longitudinal stretching operation.

Then, the film is preheated by roller 7 to the stretching temperature in the preparation for the subsequent stretching operation and then longitudinally stretched by stretching rollers 8 and 9. The rotational speeds of stretching rollers 8 and 9 are fixed respectively at $V_1$ and $V_2$ such that the ratio of the longitudinal stretching is determined by the quotient of $V_2/V_1$.

The drawing depicts the longitudinal stretching operation as being effected in one stage by the use of rollers 8 and 9. The longitudinal stretching operation, when necessary, may be carried out in a plurality of split stages by increasing the number of pairs of rollers.

When the longitudinal stretching at a given ratio is carried out in a plurality of split stages, the speed of longitudinal stretching can be lowered and the stretching stress can be apportioned to the individual split stages.

The longitudinally stretched film is cooled by cooling rollers 10 and 11 and then taken up on a roller 12. Optionally the stretched film is given a heat treatment, though not shown in the diagram, as for the improvement of thermal stability.

Since the film of the present invention generates relatively large stress during the course of stretching as compared with the conventional film, the stretching of this film in the process of its production is desired to be carried out at a relatively low speed. Specifically, this stretching speed falls in the range of 50 to 30,000%/min, preferably 100 to 10,000%/min, of the length of the raw before stretching per minute.

The longitudinal stretching is generally effected between rollers which are separated by a relatively narrow space. If the stretching is made to a high degree in this small interval, the stretching stress is sharply increased because of an inevitable increase in the stretching speed. Thus, the stretching is desired to be effected in such a manner that this stress may be apportioned into a plurality of stages. This is realized by increasing the number of stretching rollers and consequently carrying out the stretching in a plurality of split stages. In this case, the ratios of stretching or the speeds of stretching in the individual split stages are basically desired to be fixed in such a manner that all the split stages develop equal stretching stress. Since the stretching stress increases in proportion as the ratio of stretching is increased, it is desirable to carry out the stretching at a low speed, with the ratios of stretching in the split stages gradually decreased along the flow of the film. The specific number of stretching stages varies with the total ratio of stretching throughout the entire longitudinal stretching operation and may be suitably fixed and need not be specifically defined. In the case of the present invention, the number of stages is between 2 and 30. Owing to the stretching operation performed in the plurality of split stages, the stretching itself can be stabilized and the orientation of crystals to a high degree can be carried out more efficiently.

The film of the present invention may be stretched, when necessary, again in the longitudinal or lateral direction. By this repeated stretching, the orientation of crystals can be enhanced in the longitudinal or lateral direction and the mechanical properties such as the modulus of elasticity can be further improved in the direction. For this repeated stretching, the aforementioned stretching conditions can be adopted.

The film of the present invention, when necessary, may be given a heat treatment as for the improvement of thermal stability. The temperature and time of this repeated stretching are not specifically defined. Generally, the heat treatment is carried out at a temperature approximating the temperature of the regular stretching for a relatively short period such as, for example, 1 to 120 seconds.

Preparatory to the production of the film of the present invention, the raw film is formed first. If the formation of the raw film is effected by the conventional procedure which comprises melt pressing or melt extruding the resin and subsequently quenching the pressed or extruded film of the resin, rapid growth of spherulites is reconginzed to occur in the raw film. The size and distribution of spherulites which are produced in this case are varied with the cooling temperature, the cooling speed, the pressure of molding, the molecular weight, the additives, the thickness of film, and so on. In the raw sheet having a thickness in the range of 500 to 1,000 $\mu$m, for example, the mode of growth of the spherulites is varied by the change of the cooling speed in the direction of depth of the film of the from the surface to the interior. The surface layer portions form a special structure in which spherulites grow inwardly because of the sharp temperature gradient (transcrystal structure). In the interior portion, normal spherulites grow because the temperature gradient is moderated. The diameters of these spherulites generally increase in proportion as the distance from the surface increases. While these diameters heavily hinge on the cooling conditions, there are times when they vary in the range of 5 $\mu$m to 100 $\mu$m. The present inventors have concluded that when the shapes or diameters of the spherulites are distributed in the raw film in the manner described above, spherulites affect the performance of the raw film during the course of the stretching or the physical properties of the stretched raw film to a fair extent. For example, microscopic defects or internal tension due to the occurrence of discontinous boundaries between the surface layer portions and the interior portion and local concentration of stretching stress due to a coarse spherulitic structure are possible outcomes of the distribution of shapes of sperulites. When a raw film of a spherulitic structure composed of spherulites minute and uniform in diameter is processed by the method of the present invention, it exhibits an improved stretchability and notable improvements in physical properties such as modulus of elasticity.

Figure 8A:
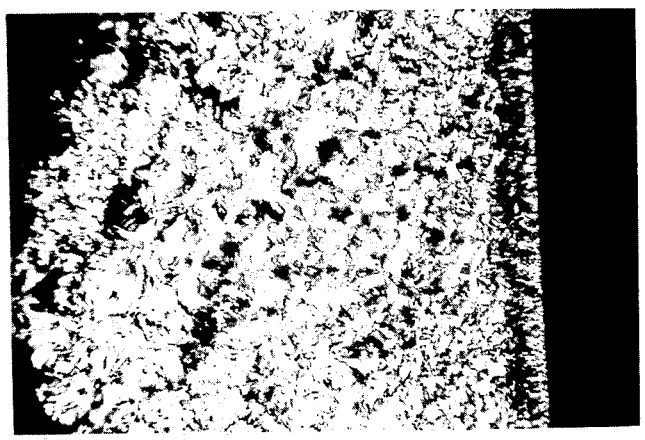
FIGS. 8(a) and (b) are photographs taken through a visible-light microscope fitted with a crossed Nicol.
Figure 8B:
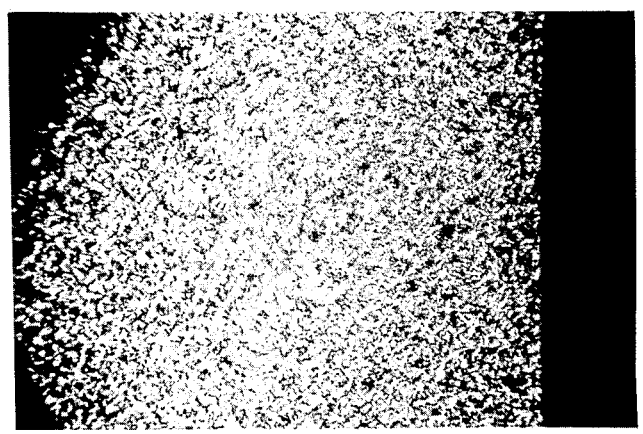
FIG. 8 (a) shows a cross section of an ordinary polyoxymethylene polymer raw film produced by quenching after the melt extrusion and FIG. 8 (b) is a cross section of the raw film composed of minute spherulites having substantially uniform diameters.

For use in the present invention, the raw film is desired to have a homogeneous spherulitic structure such that the spherulites thereof distributed throughout the entire thickness of the film have a substantially uniform diameter of not more than 30 $\mu$m. For clear illustration of this spherulitic structure, a photograph of the structure taken through a visible light microscope using a cross Nicol is shown in FIG. 8. In FIG. 8, (a) represents a photograph of the cross section of a conventional raw film obtained by the steps of melt extruding and subsequent quenching and (b) a photograph of the cross section of a raw film containing minute spherulites of a substantially uniform diameter. It is clearly noted from the photographs that the spherulitic structures of these two raw films are quite different. The raw film of the aforementioned structure composed of uniform and minute spherulites is believed to be particularly suitable for the production of a film of high strength by the stretching of a high degree as contemplated by the present invention because the binding force between polymer molecules is increased and, during the course of the stretching operation, otherwise possible local concentration of stretching stress is avoided and desirable dispersion of stress is promoted owing to the enhanced intimacy of the union between adjacent spherulites. This explains why the spherulites are desired to have as small and uniform a diameter as permissible. Preferably, the diameters of spherulites are not more than 15 $\mu$m.

As means of obtaining a raw film composed of minute and uniform spherulites as described above, such mechanical measures as quenching the melt pressed or extruded film of the resin or molding the pressed or extruded film under high pressure during the course of cooling are conceivable. By any of these measures, however, it is difficult to enable the raw film to acquire a structure composed of minute and uniform spherulites throughout the entire thickness thereof. A method has been known to the art which comprises incoporating a small amount of a nucleating agent in the resin prepared for the raw film thereby promoting the formation of crystal nucleus in the raw sheet. To be specific, a homogeneous structure composed of minute spherulites 4 to 8 $\mu$m in diameter is obtained by adding to polyoxymethylene polymer 0.0001 to 0.5% by weight of talc and uniformly dispersing this inorganic additive throughout the mass of polyoxymethylene polymer (British Patent No. 1,133,490). A method has been disclosed which permits spherulites to be produced in decreased diameters by adding to polyoxymethylene polymer before melting a specific organic nucleating agent such as, for example, a hydroxyl group-containing imidazole or pyrazine derivative which is completely insoluble or sparingly soluble in the molten polyoxymethylene polymer (British Patent No. 1,193,708). Another method is known to the art which comprises admixing linear polyoxymethylene polymer with 0.001 to 10% by weight of polyoxymethylene polymer of a branched structure or a reticulated structure (Japanese Patent Publication No. 19942/1980). The prior inventions mentioned above are effective means of obtaining raw materials of the foregoing description. In the production of the film of the present invention, the nucleating agent is not desired to affect directly the stretching capacity of the raw film or indirectly the mechanical and thermodynamic properties and the surface condition of the stretched film. To fulfil this requirement, the nucleating agent is desired to be a polymer of the same origin as polyoxymethylene polymer. The polyoxymethylene polymer possessing a branched structure or a reticulated structure involved in one of the prior inventions mentioned above is a preferred example. Several prior inventions such as, for example, Japanese Patent Publications No. 6277/1969, No. 6278/1969, No. 25114/1970, No. 26507/1970, and No. 42623/1981 each make a full account of the use of this particular polyoxymethylene polymer. A branched polyoxymethylene which has a structure that the linear polyoxmethylene polymer has branched is also effective as the nucleating agent. This is disclosed in detail in Japanese Patent Application Laid-open No. 93717/1984.

For the sake of the formation of the raw film contemplated by the present invention, the nucleating agent to be used therein is desired to be a polyoxymethylene type polymer possessing a branched or reticulated structure or to be a branched polyoxymethylene polymer. This polymer used as the nucleating agent fulfils its function more effectively and manifests its effect more conspicuously than the nucleating agent of any other kind. The amount of the nucleating agent to be used in this case is in the range of 0.001 to 10% by weight based on the amount of the polyoxymethylene resin as the raw material for the raw film. If this amount is less than 0.001% by weight, the nucleating agent fails to manifest its effect sufficiently as expected. If this amount exceeds 10% by weight, the characteristic properties of the added poloxymethylene polymer itself are reflected in the stretched film possibly in such a manner as to impair the mechanical properties such as elasticity and the thermal properties of the film. Thus, the amount of the nucleating agent so added is desired to be relatively small, falling in the range of 0.01 to 7.5% by weight, preferably 0.1 to 5% by weight.

In the formation of the raw film of the present invention, the crystallinity of the raw film obtained by the conventional method generally falls in the range of 60 to 75%, though variable with the molecular weight of the polymer or the conditions of the film formation. When the raw sheet is enabled to acquire a rather high degree of crystallinity, the stretched film is liable to exhibit improved mechanical properties including elasticity, though the raw film itself suffers from a slight decline of stretchability. As means of heightening the crystallinity of the raw film, a method relies on a heat treatment given to the raw film after the formation thereof, a method which resorts to use of polyoxymethylene polymer having a relatively low average molecular weight as in the range of 35,000 to 50,000, and a method which involves incorporation of polyoxymethylene polymer of such a relatively low molecular weight as mentioned above in a suitable proportion may be cited. Use of such a method enables the crystallinity of the raw film to be heightened to a level in the range of 75 to 85%. These methods are applicable to the working of the present invention as occasion demands.

The present invention can provide a base film which is useful for the manufacture of a magnetic recording medium as by applying magnetic particles and adhesive agent on the surface of film or by plating the surface of film with a magnetic layer.

Heretofore, base films made of such materials as cellulose acetate and polyethylene terephthalate have been popularly used for magnetic recording media. In recent years, the growing trend of electronic devices toward increase of density, decrease of size, and acceleration of signal processing speed has been urging development of a film of minimum thickness and high dimensional stability.

In the case of a magnetic tape, for example, for the purpose of enabling this magnetic tape to acquire further improved performance in travelling property and image stability, it is necessary to use for the tape a base film which particularly excels in modulus of elasticity and dimensional stability. A magnetic tape using a base film of a low modulus of elasticity possibly suffers from poor traveling property because of curly tape edges and offers a serious obstacle to the reduction of wall thickness. Poor dimensional stability of the base film compels the magnetic tape using this base film to entail such detrimental phenomena as skew and deviation of track due to changes of the environmental conditions.

The inventors have found that the film of the present invention is well qualified for a high-quality base film fulfilling the requirements mentioned above and that use of this film as a base film permits production of a magnetic recording medium of outstanding performance.

The modulus of elasticity is required to increase in proportion as the thickness of the base film decreases. The fact that a given base film has a high modulus of elasticity means that this base film can be effectively used in the magnetic recording medium in a much smaller thickness than the existing standard thickness. Thus, the base film having such a high modulus of elasticity ought to create a literally great demand. The modulus of elasticity the base film is required to possess is at least 500 kg/mm$^2$, preferably at least 700 kg/mm$^2$, at 20° C. at least in one direction. In this case the base film is allowed to be decreased to even below the level of 6 μm.

As concerns the dimensional stability, the thermal expansion coefficient of the base film is required to fall in the range of $-2\times10^{-4}$ to $2\times10^{-4}$ mm/(mm·°C.) at least in one direction at a temperature in the range of 20° to 100° C. If the thermal expansion coefficient deviates from this range, the base film is susceptible of detrimental phenomena due to changes of the environmental conditions.

The film of the present invention can amply meet the requirements pertaining to dimensional stability because of its characteristic feature of high crystallinity.

The film of the present invention fulfils the aforementioned requirements concerning quality imposed on the base film for use in the magnetic recording medium and, therefore, well qualifies as an excellent base film. Further, the film of the present invention possesses a higher level of crystallinity than the conventional film. It also exhibits highly satisfactory characteristics ascribable to this characteristic feature of high crystallinity. The film loses strength, rigidity, and other similar properties only nominally at elevated temperatures and it yields to thermal shrinkage only to a minimum extent. This film can withstand high temperatures, though briefly, up to the neighborhood of 150° C.

When the magnetic layer is formed on the base film by any of the known methods such as, for example, the coating method and the plating method, it is rather rare that the tape in the process of fabrication is exposed to an environment of an extremely high temperature. This is because, in most cases, the environment is rigidly controlled under the conditions to be defined for the sake of the base film. When the film of the present invention is used in this case, it is enabled to manifest its characteristic qualities to the fullest possible extent for the reason given above. For examle, the productivity of the magnetic recording tape is notable enhanced by allowing the coater to be used at an increased temperature.

For the film to be used effectively as the base for a magnetic recording medium, it is required to possess a high dimensional stability in a humid ambience. In other words, the film is required to possess as low a water absorbing capacity as permissible. To be more specific, the equilibrium water absorption of the film is required to be not more than 0.5% (after 24 hours' standing in water at 20° C.). Owing to its characteristic high crystallinity, the film of the present invention is capable of keeping down this value to an extremely low level. It is capable of providing a base film having an extremely low water absorption coefficient of not more than 0.3%.

For the formation of a magnetic layer on the base film, any of the various known methods can be effectively adopted. A coating type magnetic tape, for example, is obtained by preparing in a powdery form any of the magnetic substances such as $\gamma$-$Fe_2O_3$, $Cr_2O_3$, Co-doped iron oxide, Fe, Ni, Co, and other similar metals and alloys thereof, mixing this powder with suitable additives, a macromolecular binder, and a solvent thereby producing a solution, and applying this solution on the surface of a tape. Examples of the macromolecular binder usable herein incude polyvinyl chloride, polyvinylidene chloride, polyvinyl acetate type polymers, polyamides, epoxy resin, polyurethane resin, silicone resin, and mixtures thereof. As means of application usable herein, the gravure roll method, the reverse roll method, and the doctor knife method can be cited. The applied magnetic layer is subjected to the further treatments of orientation and calendering. It is otherwise possible to superpose the magnetic layer on the film of this invention by the plating method. As relatively new means of forming a magnetic layer, the method which directly superposes a magnetic layer on the base film by applying a prescribed metal by the technique of spattering, vacuum deposition, or ion plating can be cited.

With the base film provided by the present invention, the magnetic recording medium can be obtained in a heretofore unattainable small thickness as described above. The magnetic recording medium consequently produced enjoys the characteristics of high modulus of elasticity, high dimensional stability, and low water absorption and, owing to these qualities, hardly causes deformation of recorded signals and succumbs minimally to the damages done by folding of tape edges. The magnetic recording medium further enjoys the advantage that it does not suffer from such troubles as deformation of recorded signals, changes of skew, and deviations of control in the presence of heat hysteresis at relatively high temperatures. Thus, the present invention provides an excellent base film.

The film of the present invention possesses the outstanding qualities of high rigidity and high dimensional stability. Further, the present invention is directed to a method which is capable of producing the film more stably and more uniformly. The film obtained by the method of the present invention, owing to the outstanding qualities, finds extensive utility in a wide range of applications including base films for mangetic recording media such as magnetic tapes and floppy discs.

The methods adopted for the determination of the percent crystallinity and the degree of orientation of crystals of the film of the present invention will be described below.

Crystallinity

The density (d) of a given film is measured by the density gradient piping method using a solution consisting of normal heptane and carbon tetrachloride at 23° C. and the crystallinity (D) is calculated in accordance with the following formula, using the density (d) found above:

$$D = \frac{dc(d - da)}{d(dc - da)} \times 100 \, (\%)$$

In the foregoing formula, dc stands for a constant, 1.506 g/cc, representing a theoretical density of a perfectly crystallized polymer and da for a constant, 1.25 g/cc, representing a density of a corresponding perfectly amorphous polymer.

Degree of Orientation of Crystals

A strip 2 mm in thickness, 1 mm in width, and 10 mm in length relative to the direction of stretching is prepared by superposing cut pieces of a given film. Adhesion of the superposed pieces of the film is effected with a cyano-acrylate type adhesive agent. Then, this molded strip is attached to a universal sample base (rotary sample base) made by Shimazu Seisakusho Ltd. in such a manner that an X-ray will impinge on the strip in the direction of "edge" or "end" of the film.

Figure 3:
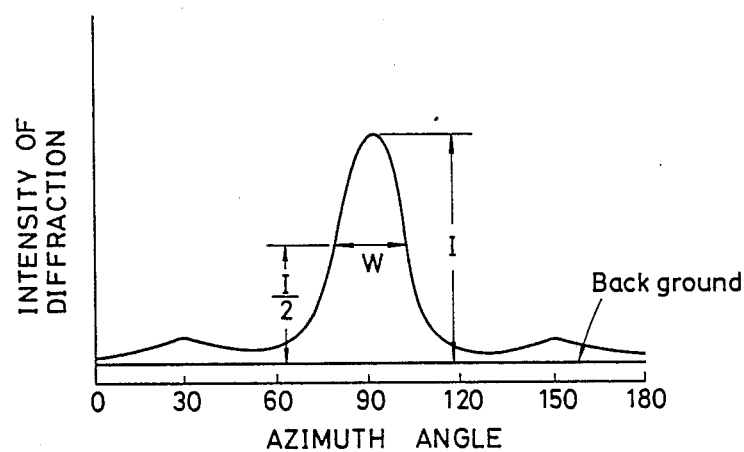
FIG. 3 is an explanatory diagram illustrating a method for the calculation of the degree of orientation of crystals.

The Cu-K $\alpha$-ray generated by an X-ray generator, Model XD-3A, made by Shimazu Seisakusho Ltd. and passed through a Ni filter at 30 KV–28 mA is used as the X-ray source. A goniometer, Model VG-108R, made similarly by Shimazu Seisakusho Ltd. is attached to the aforementioned rotary sample base. In the slit system, a receiving slit 2 mm in diameter and a scattering slit 1 mm in diameter are used. Then, the angle of diffraction is set on the (100) plane of polyoxymethylene polymer ($2\theta = 22°$ to $23.5°$), the X-ray is injected in the direction of edge and that of end and, at the same time, the rotary sample base is rotated at a rotational speed of 4°/min to scan the intensity of diffraction of the (100) plane in the direction of azimuth angle. The chart speed of the recorder is fixed at 10 mm/min. A typical set of results obtained by this measurement is illustrated in FIG. 3. Now, the method for the calculation of the degree of orientation of crystals is described below with reference to the graph. The intensity, I, of the peak of the azimuth angle 90° against the background is found and the width, W (half-value width), of the aforementioned peak showing an intensity of I/2. The background is to be determined in advance of the measurement. Then, the degree of orientation of crystals, A, is calculated in accordance with the following formula:

$$A = \frac{180 - W}{180} \times 100 \, (\%)$$

The present invention will be described more specifically below with reference to working examples. It should be noted that the present invention is not limited to these working examples.

The following properties referred to in the working examples were determined by the methods indicated correspondingly.

(1) Tensile property

A test piece 100 mm in length and 10 mm in width is set taut between chucks separated by a distance of 60 mm and drawn at a chuck speed of 30 mm/min under the conditions of 23° C. of temperature and 50% of humidity. The modulus of elasticity is calculated from the initial-stage gradient of a stress-strain curve obtained by the test.

(2) Dimensional stability

A test piece 150 mm in length and 20 mm in width having marks inscribed as separated by a distance of 100 mm is left standing at 150° C. for 2 hours to find a thermal shrinkage coefficient (%) in accordance with the method of JIS C-2318. The value consequently found is reported as dimensional stability (%) under heat.

(3) Crystal melting curve

Figure 4:
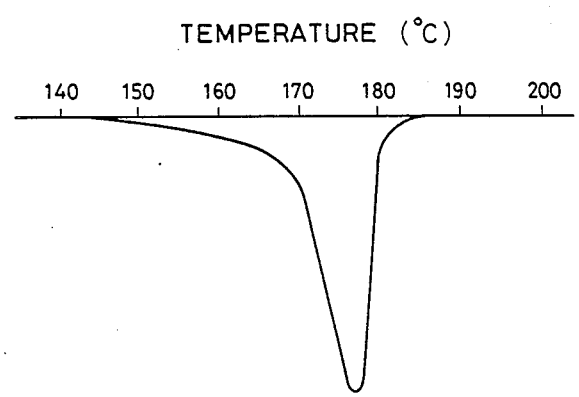
FIG. 4 is a graph showing a typical crystal melting curve found by the differential scanning calorimeter.

In a differential scanning calorimeter, model DSC-20, made by Seiko Electronic Industry Co., Ltd., a given sample 10 mg in weight is left standing, with a temperature increasing speed fixed at 10° C./min and a chart speed at 2 cm/min, to find a crystal melting curve. A typical set of results obtained by this method is shown in FIG. 4.

EXAMPLE 1

A raw film 300 μm in thickness is obtained by melt pressing pellets of homopolymer of oxymethylene having a number average molecular weight of about 63,000 under a pressure of about 200 kg/cm² at 200° C. for 2 minutes and immediately cooling the melt pressed sheet in water at a temperature of about 10° C. The crystallinity of this raw film determined by the density method is 67% and the peak temperature of the crystal melting curve obtained by DSC is 175° C.

Then, this raw film is cut into a square of 100 mm square, which is then nipped between two pieces of polymethyl methacrylate resin plates each 10 mm in thickness, preheated to a temperature of 130° C., then pressed under a pressure of about 1,000 kg/cm², and cooled. By this treatment, the raw film is expanded to (2×2) times.

Subsequently, the expanded raw film is subjected to simultaneous biaxial stretching by the use of a biaxial stretching machine (tenter type) made by Iwamoto Seisakusho, at a ratio of 3 times in each of the axial directions, at a temperature of 170° C. and a stretching speed of 170%/min. Consequently, there was obtained a film uniformly stretched biaxially to (6×6) times the original size of the raw film.

This film is tested for tensile property, crystallinity by the density method, and degree of orientation of crystals by the X-ray diffraction method. The results are shown as compared with those of the raw film in Table 1.

The biaxially stretched film obtained as described above possessed equal physical properties in both directions. In Table 1, therefore, the results obtained in one of the two directions are shown.

It is noted from the results that the film is oriented and crystallized to a high degree and that it possessed high rigidity never attained by any of the conventional polyoxymethylene films.

TABLE 1

| | Tensile property | | | | | Degree of |
|---|---|---|---|---|---|---|
| | Modulus of elasticity (kg/mm²) | Strength at rupture (kg/mm²) | Elongation (%) | Thickness (μm) | Crystallinity (%) | orientation of crystals (%) |
| Raw film | 240 | 5.5 | 29 | 300 | 67 | — |
| Example 1 | 575 | 34.5 | 17 | 9 | 80 | 87 |

EXAMPLE 2

A raw film 500 μm in thickness is obtained by extruding the same polyoxymethylene polymer as used in Example 1 through a slit die at a temperature of 200° C. and quenching the extruded film of the polymer on a casting roll kept at 120° C. The crystallinity of this raw film determined by the density method is 71% and the peak temperature of the crystal melting curve of the raw film determined by DSC is 176° C.

This raw sheet is pressed as nipped between two plates of polymethyl methacrylate resin by following the procedure of Example 1, to be expanded to (2×2) times.

Then, by the use of the same biaxial stretching machine as in Example 1, the expanded raw film is subjected to simultaneous biaxial stretching at a varying stretching temperature in the range of 160° to 177° C. and a varying stretching speed in the range of 100 to 400%/min, to produce a uniformly stretched film. Table 2 shows the stretching conditions and the stretching ratios used in the stretching operation and the properties of the stretched films collectively.

In the table, the stretching ratios represent those based on the original size of the raw film and the stretching ratios involving anisotropy are those obtained by differentiating the stretching speed in the two directions of stretching. Run No. 7 involved a heat treatment given to the stretched film at 170° C. for 1 minute.

It is noted from the results of Table 2 that the films of the present invention possesses very high degrees of rigidity and outstanding dimensional stability.

TABLE 2

| Run No. | Stretching temperature (°C.) | Stretching ratio (times) | Stretching speed (%/min) | Tensile property | | | Thickness (μm) | Crystallinity (%) | Degree of orientation of crystals (%) | Dimensional stability under heat (%) |
|---|---|---|---|---|---|---|---|---|---|---|
| | | | | Modulus of elasticity (kg/mm³) | Strength at rupture (kg/mm²) | Elongation (%) | | | | |
| 1 | 160 | 6 × 6 | 100 | 590 | 36.5 | 17.0 | 14.0 | 76 | 89 | 2.5 |
| 2 | 165 | 7 × 7 | 170 | 630 | 28.5 | 13.0 | 10.2 | 77 | 89 | 2.2 |
| 3 | 170 | 10 × 10 | 300 | 810 | 28.5 | 7.4 | 5.0 | 84 | 92 | 2.0 |
| 4 | 175 | 14 × 14 | 400 | 1070 | 29.0 | 4.1 | 2.5 | 87 | 92 | 1.8 |
| 5 | 177 | 12 × 12 | 280 | 925 | 39.5 | 7.8 | 3.5 | 85 | 91 | 1.9 |
| 6 | 170 | Longitudinal 15 | 300 | 1150 | 28.0 | 3.6 | 6.5 | 82 | 92 | 2.2 |
| | | Lateral 5 | 100 | 585 | 25.5 | 11.0 | | | 87 | 1.8 |
| 7 | 170 | 8 × 8 | 170 | 750 | 35.0 | 10.0 | 8.0 | 85 | 90 | 1.5 |
| Raw film | — | — | — | 260 | 7.5 | 52.0 | 500 | 71 | — | — |

EXAMPLE 3

A square of 100 mm which is cut from the raw film obtained in Example 2 is rolled with a two-high rolling mill consisting of two rollers each measuring 300 mm in length and 250 mm in diameter under the conditions of 70° C. of roller temperature and 1.2 m/min of rolling speed. The rolling of the square of sheet is repeated alternately in the direction of rolling and the direction perpendicular thereto until the square is stretched to twice the original size of the raw film in the direction of rolling and the direction perpendicular thereto.

The raw film thus expanded to (2×2) times the original size of the raw sheet was subjected to simultaneous biaxial stretching with the same biaxial stretching machine as used in Example 1, to produce a uniformly stretched film. Table 3 collectively shows the stretching conditions and the stretching ratios used in this case and the physical properties of the stretched film. In the table, the stretching ratios represent those based on the size of the raw film is.

and that the physical properties of the produced film are on extremely low levels as compared with those of the film of the present invention. This fact indicates clearly that a biaxially oriented film of polyoxymethylene polymer possessing highly desirable rigidity and dimensional stability is obtained only in accordance with the present invention.

COMPARATIVE EXPERIMENT 2

The raw film obtained in Example 1 is subjected, in its unmodified form, to simultaneous biaxial stretching by the use of the same stretching machine as used in Example 1, under the conditions of 173° C. of temperature and 170%/min of stretching speed. This stretching entailed the phenomenon of necking and gave rise to a partly ununiformly stretched portion. There is obtained a film stretched to (3×3) times. The physical properties of this stretched film are as shown in Table 4. It is noted from the results that the film possessed a low degree of orientation of crystals and, therefore, failed to acquire sufficient physical properties, though it fulfilled the

TABLE 3

| Run No. | Stretching temperature (°C.) | Stretching ratio (times) | Stretching speed (%/min) | Tensile property | | | Thickness (μm) | Crystallinity (%) | Degree of orientation of crystals (%) | Dimensional stability under heat (%) |
|---|---|---|---|---|---|---|---|---|---|---|
| | | | | Modulus of elasticity (kg/mm²) | Strength at rupture (kg/mm²) | Elongation (%) | | | | |
| 8 | 170 | 6 × 6 | 170 | 580 | 25.0 | 11.5 | 14.0 | 76 | 88 | 2.8 |
| 9 | 170 | 8 × 8 | 280 | 755 | 33.0 | 9.3 | 7.5 | 80 | 91 | 2.0 |
| 10 | 173 | 10 × 10 | 280 | 790 | 36.5 | 9.8 | 5.2 | 83 | 91 | 2.0 |

COMPARATIVE EXPERIMENT 1

The raw film expanded by rolling to (2×2) times in Example 3 is stretched by the use of the same stretching machine as used in Example 1 in one direction by 100% under the conditions of 170° C. of temperature and 300%/min of stretching speed, to produce a film stretched to (2×4) times the size of the raw film. The physical properties of this stretched film are shown in Table 5. This comparative experiment is performed in accordance with a working example cited in Japanese Patent Publication No. 21994/1965. It is noted from the results of Table 4 that the film produced herein is not oriented or crystallized to any appreciably high degree requirement of this invention on crystallinity.

COMPARATIVE EXPERIMENT 3

The raw film stretched to (2×2) times by the pressing treatment in Example 1 is again subjected to the same pressing treatment, to produce a biaxially oriented film having a stretching ratio of (5×5) times the size of the raw film. The physical properties of this biaxially oriented film are as shown in Table 4. It is noted from the results that even when the degree of orientation of crystals fulfilled the requirement of the present invention, the film having a low level of crystallinity could not be expected to acquire satisfactory physical properties.

TABLE 4

| | Measured Direction | Tensile property | | | Thickness (μm) | Crystallinity (%) | Degree of orientation of crystals (%) | Dimensional stability under heat (%) |
|---|---|---|---|---|---|---|---|---|
| | | Modulus of elasticity (kg/mm²) | Strength at rupture (kg/mm²) | Elongation (%) | | | | |
| Comparative Experiment 1 | Direction stretched by 2 times | 395 | 25.0 | 30.0 | 62 | 72 | 75 | 4.2 |

TABLE 4-continued

|  | Measured Direction | Tensile property | | | Thickness (μm) | Crystallinity (%) | Degree of orientation of crystals (%) | Dimensional stability under heat (%) |
| --- | --- | --- | --- | --- | --- | --- | --- | --- |
|  |  | Modulus of elasticity (kg/mm²) | Strength at rupture (kg/mm²) | Elongation (%) |  |  |  |  |
|  | Direction stretched by 4 times | 420 | 38.0 | 17.5 |  |  | 81 | 6.5 |
| Comparative Experiment 2 | — | 330 | 20.0 | 26.0 | 55 | 76 | 77 | 4.0 |
| Comparative Experiment 3 | — | 400 | 18.0 | 12.0 | 20 | 66 | 88 | 10.7 |

EXAMPLE 4

By the use of a biaxially stretching machine (tenter type) fitted with a stretching stress sensor and made by Iwamoto Seisakusho, the raw film obtained in Example 1 is subjected to restrained uniaxial stretching at a ratio of 6 times in one direction under the conditions of 175° C. of temperature and 170%/min of stretching speed. Then, the stretched film is retained at the aforementioned stretching temperature for 5 seconds. It is then stretched at a ratio of 6 times in the direction perpendicular to the aforementioned direction of stretching at the same stretching temperature and the same stretching speed, to produce a film biaxially stretched to (6×6) times. Although this film showed slightly inferior transparency because of minute voids generated therein during the course of stretching operation, it enjoyed high uniformity.

Figure 5:
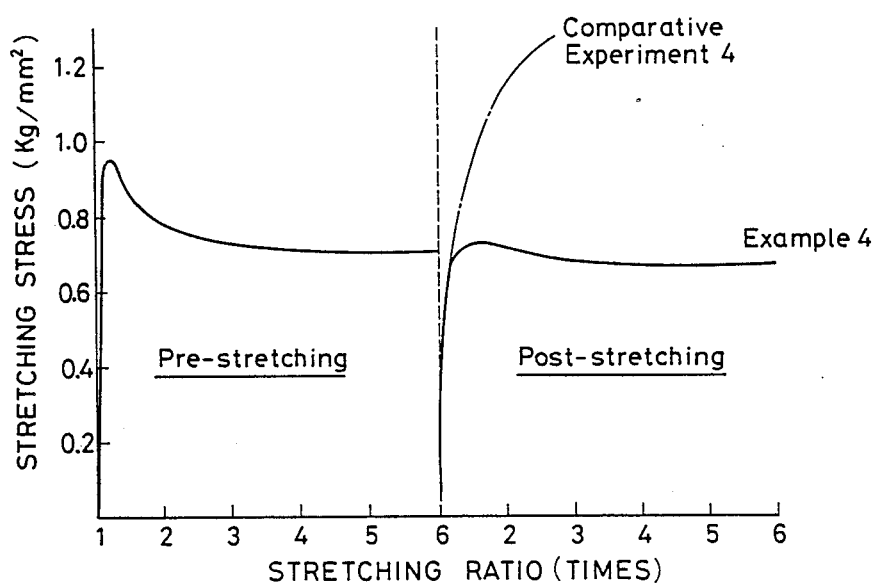
FIG. 5 is a graph showing the relation between the stretching ratio and the stretching stress.

The relation between the stretching stress and the stretching ratio obtained in the pre-stretching stage and the post-stretching stage in this experiment is as shown in FIG. 5. It is noted from the diagram that the stress changed stably in both the pre-stretching stage and the post-stretching stage. The tensile property, the crystallinity determined by the density method, and the degree of orientation of crystals determined by the X-ray diffraction method of the film obtained herein are shown as compared with those of the raw film in Table 5.

The biaxially stretched film obtained described above possessed equal physical properties in both directions. In Table 5, therefore, the results obtained in one of the two directions are shown.

COMPARATIVE EXPERIMENT 4

In the procedure of Example 4, the raw film is pre-stretched and the stretched film is cooled with air to room temperature. When the cooled film is stretched in the direction perpendicular to the direction of the pre-stretching under the conditions of 175° C. of temperature and 170%/min of stretching ratio, it sustained a fracture when the ratio of stretching reached 2.6 times. The relation between the stretching stress and the stretching ratio obtained in this case is shown in FIG. 5 as compared with the relation obtained in Example 4. It is noted from the diagram that the fracture is caused by very high stretching stress.

EXAMPLE 5

A raw film 700 μm in thickness and 150 mm in width is obtained by extruding the same polyoxymethylene polymer as in Example 1 through a slit die at 200° C. and quenching the extruded film with a casting roller heated at 130° C. The crystallinity of the raw film determined by the density method is 70% and the peak temperature of the crystal melting curve obtained by the DSC is 176° C.

Then, the raw film is rolled through a 4-high rolling mill consisting of work rollers 50 mm in diameter and 400 mm in width and backup rollers 100 mm in diameter and 400 mm in width at 100° C. In this case, the ratio of rolling is 2 times and the draft was 0.5. The crystallinity of the rolled raw film is 67%.

Subsequently, the rolled film is led to a tenter type lateral stretching machine kept at a stretching temperature of 173° C. and laterally stretched at a stretching speed of 200%/min by a stretching ratio of 8 times in the direction of width. The laterally stretched film is then led to a temperature retaining zone, there to be fixed with pinch rollers so as to be prevented from shrinkage in the direction of width, and with the tenter clip parts of the film edges slit, further led to a roller type longitudinal stretching machine. In this case, the temperature of the temperature retention zone is 170° C. and the retention time of the film in this zone intervening between the pre-stretching and post-stretching stages is 60 seconds.

During the course of the longitudinal stretching operation, the sheet is preheated by heating rollers to a stretching temperature of 175° C. and then stretched by stretching rollers by a ratio of 4 times. The rotational speeds of the stretching rollers were $V_1 = 1$ m/min and $V_2 = 4$ m/min.

In consequence of the process mentioned above, there is obtained a polyoxymethylene polymer film uniformly and stably stretched to (8×8) times the original size of the raw film. The biaxially stretched film has an average thickness of 11 μm. The tensile property, crystallinity, and degree of orientation of crystals of this film are as shown in Table 6.

In the table, the degrees of orientation of crystals respectively represent the value found from the direction of edge of the film with respect to the machine direction and the value found from the direction of end of the film with respect to the transverse direction.

TABLE 5

| Sample | Tensile property | | | Thickness (μm) | Crystallinity (%) | Degree of orientation of crystals (%) |
| --- | --- | --- | --- | --- | --- | --- |
|  | Modulus of elasticity (kg/mm²) | Strength at rupture (kg/mm²) | Elongation (%) |  |  |  |
| Raw film | 240 | 5.5 | 29 | 300 | 67 | — |
| Example 4 | 583 | 35 | 17 | 9 | 81 | 87 |

TABLE 6

| Example 5 | Tensile property | | | Thickness (μm) | Crystallinity (%) | Degree of orientation of crystals (%) |
| --- | --- | --- | --- | --- | --- | --- |
| | Modulus of elasticity (kg/mm²) | Strength at rupture (kg/mm²) | Elongation (%) | | | |
| MD | 730 | 34 | 10 | 11 | 81 | 90 |
| TD | 690 | 29 | 13 | | | 89 |

MD: Direction of length of film
TD: Direction of width of film

EXAMPLE 6

In the procedure of Example 5, the laterally stretched film is cooled with air to room temperature and then subjected to longitudinal stretching under the same conditions as in Example 5. Consequently, there is obtained a film stretched to (8×8) times. In the process of stretching, however, this film sustained many ruptures and suffered from poor stability and is fairly inferior to the film of Example 5 in terms of yield. The physical properties of the film thus produced are virtually equal to those of Example 5.

EXAMPLE 7

Figure 6:
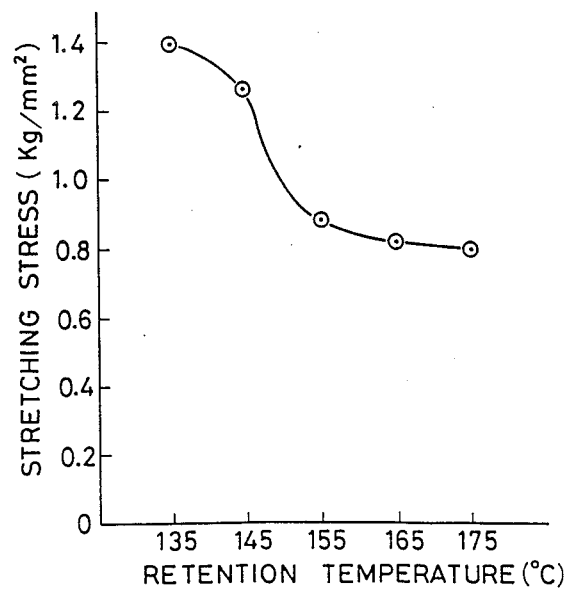
FIG. 6 is a graph showing the relation between the temperature retained and the stretching stress.

The rolled film obtained in Example 5 is subjected to restrained uniaxial stretching by the use of the same biaxial stretching machine as in Example 1 at a ratio of 6 times in the direction perpendicular to the rolling direction under the conditions of 175° C. of temperature and 170%/min of speed. Then, the film was lowered to a varying temperature of 135°, 145°, 155°, or 165° C., retained at the lowered level for 30 sec., again heated to a stretching temperature of 175° C., and then stretched at a speed of 170%/min. in the direction perpendicular to the aforementioned direction. The time required for the film to reach the post-stretching stage after departure from the pre-stretching stage was approximately in the range of 4 to 5 minutes. During the course of this post-stretching operation, the relation between the stretching ratio and the stretching stress was found and the stretching stress was found when the stretching ratio was 2.5 times (5 times, including the ratio during the rolling) at the aforementioned varying retention temperature. The results are shown in FIG. 6. In the diagram, the value at 175° C. represents the stress found of the sample post-stretched after 5 minutes' retention at the indicated stretching temperature. From the results, it is noted that the stretching stress sharply increased when the retention temperature fell below the level of 145° C.

EXAMPLE 8

Figure 7:
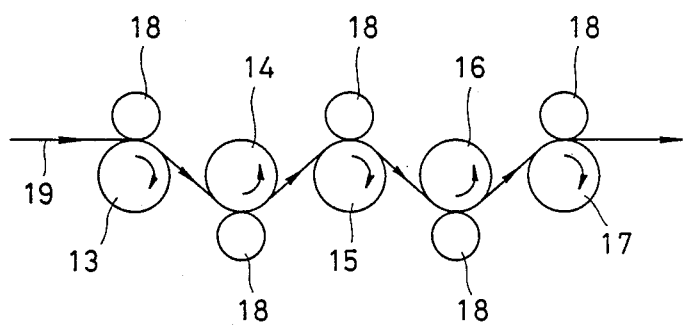
FIG. 7 is a diagram showing a typical layout of stretching rollers used in the longitudinal stretching process described in Example 8. In the diagram, 13 through 17 each stand for a stretching roller, 18 for a pinch roll, and 19 for a film.

In the procedure of Example 5, the longitudinal stretching operation was carried out in a plurality of stages by the use of a rolling mill laid out as illustrated in FIG. 7. With reference to the diagram, the rotational speeds of the individual stretching rolls were fixed at $V_1=1$ m/min, $V_2=1.7$ m/min, $V_3=2.6$ m/min, $V_4=3.8$ m/min, and $V_5=5$ m/min. During the course of this longitudinal stretching operation, the film is stretched finally to 5 times in the longitudinal direction. By dividing the longitudinal stretching process into a plurality of stages as in this case, the frequency of ruptures suffered during this stretching operation is notably diminished and the stretching itself could be effected more stably at an increased ratio.

As the result of the stretching operation described above, there is obtained a film uniformly and stably stretched to (10×8) times the original size of the raw film. The film thus produced has an average thickness of 9 μm. The tensile property, crystallinity, and degree of orientation of crystals of this film are as shown in Table 7.

TABLE 7

| Example 8 | Tensile property | | | Thickness (μm) | Crystallinity (%) | Degree of orientation of crystals (%) |
| --- | --- | --- | --- | --- | --- | --- |
| | Modulus of elasticity (kg/mm²) | Strength at rupture (kg/mm²) | Elongation (%) | | | |
| MD | 800 | 30 | 8 | 9 | 81 | 91 |
| TD | 710 | 35 | 12 | | | 90 |

MD: Direction of length of film
TD: Direction of width of film

EXAMPLE 9

The same raw sheet as in Example 5 is rolled by the use of the same rolling mill as in Example 5 and the relation between the stretching ratio and the stretchability is found. The stretching is carried out at a varying ratio of 1.2, 1.5, 2, 3, 4, 5, and 6 times. The film temperature during the rolling operation is as shown in Table 8. The rolled film is then laterally stretched by a ratio of 6 times in the direction of width under the conditions of 175° C. of stretching temperature and 200%/min of stretching speed. Then, the laterally stretched film is led to a temperature retention zone similarly to Example 5 and longitudinally stretched at a stretching temperature of 175° C. by a longitudinal stretching machine. In this case, the stretching ratio is fixed in due consideration of the ratio of rolling so that the longitudinal stretching is obtained by a fixed overall ratio of 6 times the original size of the raw film.

In consequence of the stretching operation described above, there was obtained a film biaxially stretched to (6×6) times the original size of the raw film. The rolling ratio, the film temperature during the rolling operation, the draft, the crystallinity of the rolled film, and the performance of the film during the course of each of the stretching operations are collectively shown in Table 8. It is noted from the result that biaxially oriented polyoxymethylene polymer films are stably and uniformly obtained under the rolling conditions specified by the present invention.

TABLE 8

| Rolling ratio (times) | Film temperature during rolling (°C.) | Draft (—) | Crystallinity of rolled film (%) | Stretchability Lateral stretching | Stretchability Longitudinal stretching | Remark |
|---|---|---|---|---|---|---|
| 1.2 | 100 | 0.17 | 69.0 | | Δ | Partial rupture during longitudinal stretching |
| 1.5 | 100 | 0.33 | 68.0 | | | |
| 2 | 100 | 0.5 | 66.5 | | | |
| 3 | 120 | 0.67 | 66.0 | | | |
| 4 | 130 | 0.75 | 66.0 | ~Δ | | Slightly ununiform lateral stretching |
| 5 | 130 | 0.8 | 67.5 | Δ | Δ | Partial rupture during lateral stretching and slightly ununiform lateral stretching |
| 6 | 140 | 0.83 | 68.0 | Δ~X | — | Frequent rupture during lateral stretching and ununiform laterial stretching |

EXAMPLE 10

The stretched film obtained in Example 8 was kept taut and given a heat treatment at 175° C. for 15 seconds. The physical properties of the film after the heat treatment are as shown in Table 9.

A video magnetic tape was produced by applying a magnetic coating material of the following composition in a thickness of 5 μm on this film.

| Composition of magnetic coating material | |
|---|---|
| γ-$Fe_2O_3$ powder | 22 parts by weight |
| Soybean lecitin | 0.5 part by weight |
| Nitrocellulose | 1.5 parts by weight |
| Polyurethane | 9.0 parts by weight |
| Methylisobutyl ketone | 50 parts by weight |
| Toluene | 17 parts by weight |

Then, on a helical scan type commercially available home video tape recorder (produced by Matsushita Electric Industrial Co., Ltd. and marketed under product code of NV-350), the tape was tested for travelling property and image stability. The results are as shown in Table 9.

In Table 9, the term "tape skew, a (in μsec)" denotes the deviation of a picture image from the vertical standard line in the lowermost part of a reproduced TV scene obtained by recording a picture image of vertical lines on the tape under the conditions of 20° C. and 60% RH, allowing the tape to stand at 80° C. for 24 hours, allowing the tape to cool off to room temperature, and immediately reproducing the recorded picture image on the video tape recorder. The term "tape skew, b (in μsec)" denotes the value obtained at room temperature after the similarly recorded tape has been left standing under the conditions of 40° C. and 80% RH. The term "thermal expansion coefficient" denotes the value calculated from the inclination of a curve obtained by measuring the elongation of the tape when the tape is heated under a load of 1 gr/5 mm width at a temperature increasing speed of 2° C./min in the temperature range of from 20° C. to 100° C.

COMPARATIVE EXPERIMENT 5

A tubular polyoxymethylene polymer film 15 μm in thickness is obtained by extruding the same pellets of polyoxymethylene polymer as used in Example 1 through a circular die at a temperature of 200° C. and subjecting the extruded web to inflation molding. The crystallinity, degree of orientation of crystals, mechanical properties, and other properties of this tubular film are shown in Table 9 as compared with those of the film of Example 10.

Then, the same magnetic coating material as used in Example 10 is applied on the film. The film is then tested similarly for travelling property and image stability. The results are as shown in Table 9.

It is noted from the results of Table 9 that the film according to the present invention possesses extremely high properties for a base film of a magnetic recording medium.

EXAMPLE 11

The video magnetic tape obtained in Example 10 is kept taut and heated at 150° C. for 5 minutes and then tested for skew similarly to Example 10. The skew is as small as 10 μsec., indicating that the base film of the present invention could withstand a fairly high temperature, though for a brief span of time. When the tape obtained in Comparative Experiment 5 is similarly tested, the skew of the tape is found to be not less than 20 μsec.

COMPARATIVE EXPERIMENT 6

A video magnetic tape is produced by applying the magnetic coating material on a biaxially oriented polyethylene terephthalate film 9 μ in thickness by following the procedure of Example 10. After this tape is kept loose and heated at 150° C. for 5 minutes, the skew of the tape is too large to be measured, indicating that the tape is practically worthless.

TABLE 9

| | | Tensile property | | | Degree of orientation of crystals (%) | Crystallinity (%) | Thermal expansion coefficient (mm/ (mm · °C.)) | Equilibrium absorption ratio (%) | Travelling property | Tape skew a (μsec) | Tape skew b (μsec) |
|---|---|---|---|---|---|---|---|---|---|---|---|
| | | Modulus of elasticity (kg/mm²) | Strength at rupture (kg/mm²) | Elongation % | | | | | | | |
| Example 10 | MD | 780 | 30 | 8 | 90 | 82 | 0.25 × $10^{-4}$ | 0.18 | Fine | 9 | 1.8 |
| | TD | 700 | 35 | 14 | 88 | | 0.30 × $10^{-4}$ | | | | |

TABLE 9-continued

|  |  | Tensile property | | | Degree of orientation of crystals (%) | Crystallinity (%) | Thermal expansion coefficient (mm/ (mm · °C.)) | Equilibrium absorption ratio (%) | Traveling property | Tape skew | |
|---|---|---|---|---|---|---|---|---|---|---|---|
|  |  | Modulus of elasticity (kg/mm²) | Strength at rupture (kg/mm²) | Elongation (%) |  |  |  |  |  | a (μsec) | b (μsec) |
| Comparative Experiment 5 | MD | 290 | 8.0 | 42 | 62 | 73 | 2.2 × 10⁻⁴ | 0.55 | Folding of edge | not less than 20 | 2 |
|  | TD | 300 | 8.5 | 44 | 65 |  | 2.3 × 10⁻⁴ |  |  |  |  |

EXAMPLE 12

Pellets of polyoxymethylene polymer having branched polyoxymethylene polymer homogeneously admixed therewith are obtained by mixing the same pellets of polyoxymethylene polymer as in Example 1 with 1.5% by weight of pellets of branched polyoxymethylene polymer (produced by Polyplastics Co., Ltd. and marketed under trademark designation of "DURACON U10-01"), homogenizing the resultant mixture, and pelletizing the homogenized mixture. Then, the pellets of polyoxymethylene polymer are extruded through a slit die at a temperature of 200° C. and quenched on a casting roll heated at 130° C., to produce a raw film 700 μm in thickness and 150 mm in width. The crystallinity of this raw film determined by the density method is 70% and the peak temperature in the crystal melting curve obtained by the DSC was 176° C. When the spherulitic structure in a cross section of this raw film is observed under a visible-light microscope fitted with a crossed Nicol, it is found to be composed of minute spherulites of not more than 15 μm in diameter distributed from the surface layer portions through the interior as shown in FIG. 8 (b). These spherulites has substantially uniform diameters and distributed uniformly throughout the entire thickness of the film.

Then, this raw film is rolled at a ratio of 2 times similarly to Example 5. The crystallinity of the rolled film is 67%.

The rolled film is led to a tenter type lateral stretching machine kept at a stretching temperature of 173° C. and laterally stretched at a stretching speed of 250%/min. by a stretching ratio of 10 times in the direction of width. Subsequently, the laterally stretched film is led to a temperature retention zone, fixed with pinch rollers to be prevented from shrinkage in the direction of width, and led to a roller type longitudinal stretching machine. In this case, the tenter clip parts of the film edges are led in their unslit form to the longitudinal stretching machine. The longitudinal stretching effected on the tape with the aforementioned tenter clip parts left intact is effective in preventing the film from shrinkage in the direction of width due to the neck-in of the film. The temperature of the temperature retention zone is kept at 173° C. The retention time of the film in this zone interventing between the pre-stretching and post-stretching stages is 60 seconds.

The longitudinal stretching is carried out through a plurality of stages similarly to Example 8. The temperatures of the plurality of rollers are set at a fixed level of 175° C. and the rotational speeds of the rolls are the same as those of Example 8. By this longitudinal stretching operation, the film is stretched by an overall ratio of 5 times in the longitudinal direction. In consequence of the process described above, there is obtained a film stretched to (10 × 10) times the original size of the raw film.

Since the raw film is composed of spherulites of a uniform diameter in this example, the series of steps are stably carried out despite such a high ratio of stretching of (10 × 10) times. Consequently, the film enjoyed further improved stretchability. The film thus obtained has an average thickness of 7 μm. The tensile property, crystallinity, and degree of orientation of crystals of the film are as shown in Table 10. Comparison of the film of Example 8 and that of the present example in modulus of elasticity reveals that for the fixed stretching ratio, the modulus of elasticity in this example is superior to that of Example 8. This fact indicates that the film of this example possesses more improved physical properties.

TABLE 10

| Example 12 | Tensile property | | | Thickness (μm) | Crystallinity (%) | Degree of orientation of crystals (%) |
|---|---|---|---|---|---|---|
|  | Modulus of elasticity (kg/mm²) | Strength at rupture (kg/mm²) | Elongation (%) |  |  |  |
| MD | 850 | 33 | 8 | 7 | 82 | 91 |
| TD | 820 | 34 | 9 |  |  | 90 |

MD: Direction of length of film
TD: Direction of width of film.

What is claimed is:

1. A magnetic recording medium comprising a substrate having a magnetic layer disposed thereon, said substrate comprising a biaxially oriented film of a polyoxymethylene polymer having the main part of each of the main chains thereof substantially composed of repeating units of the oxymethylene group, —CH₂—O— and having a number average molecular weight in a range of from 35,000 to 300,000, which biaxially oriented polyoxymethylene polymer film is characterized by a percent crystallinity as measured by the density method in the range of 75 to 95% and a degree of crystal orientation as measured by the X-ray diffraction method in each of the two directions of end and edge in the range of 80 to 98%.

2. The magnetic recording medium according to claim 1, wherein the polyoxymethylene polymer comprises 99.999 to 90% by weight of linear polyoxymethylene and 0.001 to 10% by weight of a branched structure or a reticulated structure.

3. The magnetic recording medium according to claim 1, wherein said film is formed from a pre-oriented film having a homogeneous spherulitic structure composed of spherulite of less than 30 μm in diameter which have substantially uniform diameters and which are distributed from the surface layer portions through the interior.

4. The magnetic recording medium according to claim 1, wherein said polymer comprises an acetalized polyoxymethylene polymer.

5. The magnetic recording medium according to claim 1, wherein said polymer comprises an isocyanatized polyoxymethylene polymer.

* * * * *